United States Patent
Konishi et al.

(10) Patent No.: US 11,658,524 B2
(45) Date of Patent: May 23, 2023

(54) ROTARY ELECTRIC MACHINE

(71) Applicant: Mitsubishi Electric Corporation, Tokyo (JP)

(72) Inventors: Keiichi Konishi, Tokyo (JP); Naoki Ohashi, Tokyo (JP); Ryuichi Kitora, Tokyo (JP); Koichi Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 16/965,843

(22) PCT Filed: May 9, 2018

(86) PCT No.: PCT/JP2018/017874
§ 371 (c)(1),
(2) Date: Jul. 29, 2020

(87) PCT Pub. No.: WO2019/215826
PCT Pub. Date: Nov. 14, 2019

(65) Prior Publication Data
US 2021/0119500 A1  Apr. 22, 2021

(51) Int. Cl.
*H02K 1/18* (2006.01)
*H02K 1/14* (2006.01)
*H02K 5/24* (2006.01)

(52) U.S. Cl.
CPC ............... *H02K 1/185* (2013.01); *H02K 1/14* (2013.01); *H02K 1/146* (2013.01); *H02K 1/18* (2013.01); *H02K 5/24* (2013.01)

(58) Field of Classification Search
CPC ............ H02K 1/146; H02K 5/20; H02K 5/24; H02K 1/185; H02K 1/187; H02K 1/18;
(Continued)

(56) References Cited

U.S. PATENT DOCUMENTS 11,139,715 B2 *  10/2021  Onishi ................. H02K 15/14
2011/0080064 A1   4/2011  Kudose et al.
(Continued)

FOREIGN PATENT DOCUMENTS

CN   107709775 A   2/2018
EP   3 315 774 A1  5/2018
(Continued)

OTHER PUBLICATIONS

Communication dated Feb. 9, 2021, issued by the Japanese Patent Office in application No. 2020-517667.
(Continued)

*Primary Examiner* — Alexander A Singh
(74) *Attorney, Agent, or Firm* — Sughrue Mion, PLLC; Richard C. Turner

(57) ABSTRACT

Provided is a rotary electric machine that is able to suppress vibration noise of the rotary electric machine caused by an out-of-plane deformation. The rotary electric machine includes a stator including a frame being an annular member, and a plurality of split cores arranged in an annular shape and fitted to and held by a radially inner portion of the frame, wherein the frame is formed such that an inner diameter of each of both end portions thereof is smaller than an inner diameter of an axial middle portion thereof, and fitting fastening force between the frame and each split core is set to be greater at both the end portions than at the axial middle portion.

23 Claims, 9 Drawing Sheets

(58) Field of Classification Search
CPC .......... H02K 1/148; H02K 1/141; H02K 1/14; H02K 3/522; H02K 5/04; H02K 1/20; H02K 9/00; H02K 9/08; H02K 9/10; H02K 9/14; H02K 9/16; H02K 9/18; H02K 9/19; H02K 9/197
USPC .............................. 310/89, 216.088, 216.008
See application file for complete search history.

(56) References Cited

U.S. PATENT DOCUMENTS

| | | | | |
|---|---|---|---|---|
| 2016/0118858 | A1* | 4/2016 | Ojima | H02K 9/00 310/52 |
| 2017/0288493 | A1 | 10/2017 | Ohashi et al. | |
| 2020/0161911 | A1* | 5/2020 | Yoshinori | H02K 1/20 |

FOREIGN PATENT DOCUMENTS

| | | |
|---|---|---|
| JP | 2007-104877 A | 4/2007 |
| JP | 2009-131006 A | 6/2009 |
| JP | 4905568 B2 | 3/2012 |
| JP | 2015-198515 A | 11/2015 |
| JP | 2017-184512 A | 10/2017 |

OTHER PUBLICATIONS

International Search Report for PCT/JP2018/017874 dated Aug. 14, 2018 [PCT/ISA/210].

Written Opinion for PCT/JP2018/017874 dated Aug. 14, 2018 [PCT/ISA/237].

Office Action dated Oct. 21, 2022 from the China National Intellectual Property Administration in CN Application No. 201880092904.8.

Communication dated Mar. 11, 2023 from the State Intellectual Property Office of P.R. of China in English Application No. 201880092904.8 Translation.

* cited by examiner

ROTARY ELECTRIC MACHINE

CROSS REFERENCE TO RELATED APPLICATIONS

This application is a National Stage of International Application No. PCT/JP2018/017874 filed May 9, 2018.

TECHNICAL FIELD

The present disclosure relates to rotary electric machines including a stator in which a plurality of split cores are fitted to and held by a frame being an annular member.

BACKGROUND ART

In conventional rotary electric machines, interference is varied to overcome problems such as deteriorations in cylindricity and circularity of a radially inner circumference of fitted split cores caused by rigidity differences of portions of a frame being an annular member, a core deformation and an increased core loss at a portion where fastening force is excessive, and so on.

Patent document 1 describes a rotary electric machine including split cores and a ring that binds the split cores, in which interference is varied by different rigidities of portions of the ring to achieve improved cylindricity.

Patent document 2 describes a rotary electric machine in which a flange is provided on an outer casing that is fitted and fixed to an outer circumference of a core assembly including split cores fitted together with a predetermined interference, so that circumferential rigidity is increased, and circularity of the core assembly is maintained at a high level.

Patent document 3 describes a rotary electric machine in which an interference for a thin portion resulting from formation of a cooling passage for a frame is greater than an interference for a thick portion where no cooling passage exists to reduce imbalance of compressive stress for a stator core.

Each of patent documents 1 to 3 proposes a configuration in which an interference for a rigid portion of a frame is made smaller than an interference for another portion.

CITATION LIST

Patent Documents

Patent Document 1: Japanese Laid-Open Patent Publication No. 2009-131006
Patent Document 2: Japanese Patent No. 4905568
Patent Document 3: Japanese Laid-Open Patent Publication No. 2017-184512

SUMMARY OF THE INVENTION

Problems to be Solved by the Invention

In each of patent documents 1 to 3, the interference is varied in accordance with rigidity of the frame with a focus placed on the rigidity of the frame alone.

However, particularly in the case of concentrated winding split cores, an axial middle portion of a radially outer core surface bulges into a substantially barrel-like shape due to a tension applied when a coil is wound around a laminated core, and therefore, the interference needs to be determined with both the frame rigidity and the radially outer core surface in a substantially barrel-like shape taken into account.

Further, in a rotary electric machine with this conventional concept, because of the substantially barrel-like shape of a core after the winding, fastening force becomes insufficient particularly at both end portions of the core, and out-of-plane (out-of-plane with respect to a plane perpendicular to a stator axis) rigidity of a whole stator including a frame and the core becomes insufficient, producing a problem of vibration noise owing to an out-of-plane deformation.

This problem tends to easily become manifest particularly with a flat-type rotary electric machine with a relatively low out-of-plane rigidity. Increasing the rigidity at both end portions of the frame, and fastening the whole with a large interference through shrink fitting, have been conceived of as solutions to the above problem, but the former is disadvantageous in dimensional constraints, etc., while the latter is disadvantageous in a core loss and a core deformation caused by local excessive fastening.

The present disclosure has been made to solve the above problem and an object of the present disclosure is to provide a rotary electric machine that is able to suppress vibration noise of the rotary electric machine caused by an out-of-plane deformation.

Solution to the Problems

A rotary electric machine according to one aspect of the present disclosure includes a stator including a frame being an annular member, and a plurality of split cores arranged in an annular shape and fitted to and held by a radially inner portion of the frame, wherein the frame is formed such that an inner diameter of each of both end portions thereof is smaller than an inner diameter of an axial middle portion thereof, and fitting fastening force between the frame and each split core is set to be greater at both the end portions than at the axial middle portion.

Effect of the Invention

The rotary electric machine according to one aspect of the present disclosure generates little noise and little vibration owing to an out-of-plane deformation (out-of-plane deformation perpendicular to a stator axis) even with use of concentrated winding split cores with an axial middle portion that bulges as a result of coil winding.

DESCRIPTION OF EMBODIMENTS

First Embodiment

Figure 1:
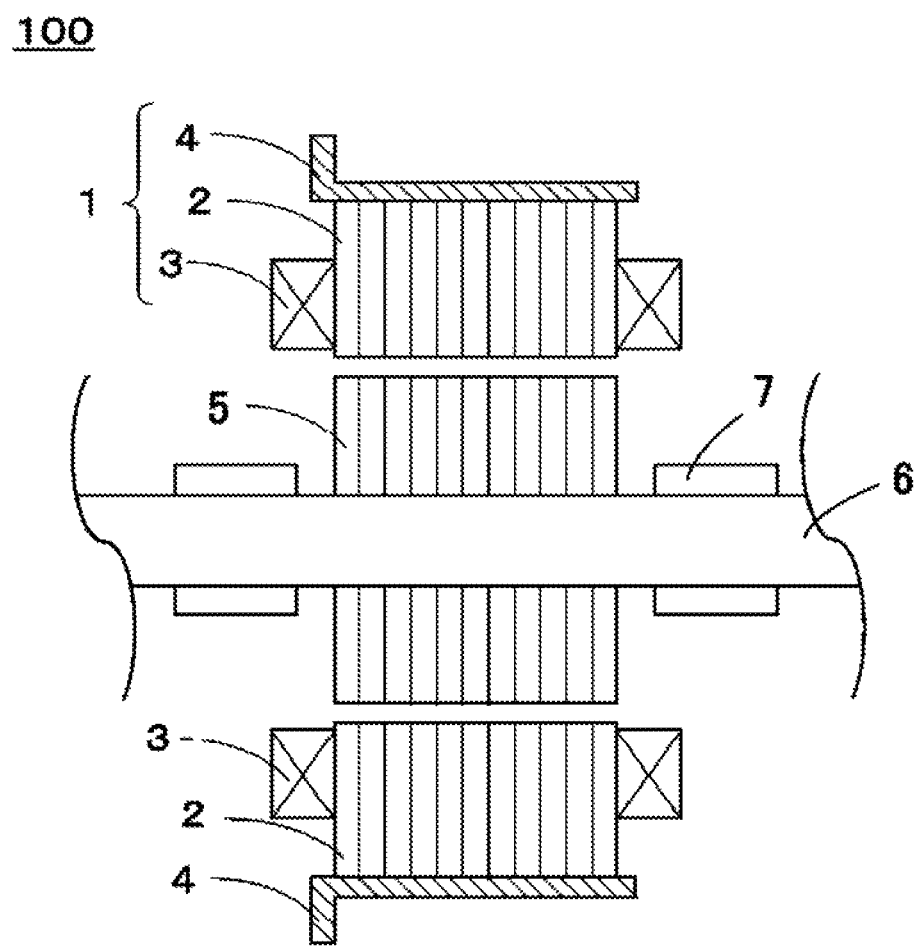
FIG. 1 is an axial sectional view schematically illustrating the structure of a rotary electric machine according to a first embodiment of the present disclosure.

FIG. 1 is an axial sectional view schematically illustrating a rotary electric machine according to a first embodiment of the present disclosure.

In FIG. 1, a rotary electric machine 100 includes a stator 1, and a rotor 5 that rotates about a rotating shaft 6 inside of the stator. The stator 1 includes split cores 2, concentrated winding coils 3 wound around the split cores 2, and a frame 4, which is an annular member to hold the split cores 2.

The split cores 2 are each formed by a plurality of steel sheets stacked in an axial direction, have division surfaces each extending in a direction that crosses a circumferential direction of the stator 1, and are held by a radially inner portion of the frame 4 while being in contact therewith and arranged in an annular shape.

The rotor 5 is supported by bearings 7 so as to rotate about the rotating shaft 6. A magnet(s) attached to the rotor 5 is not shown.

Figure 2:
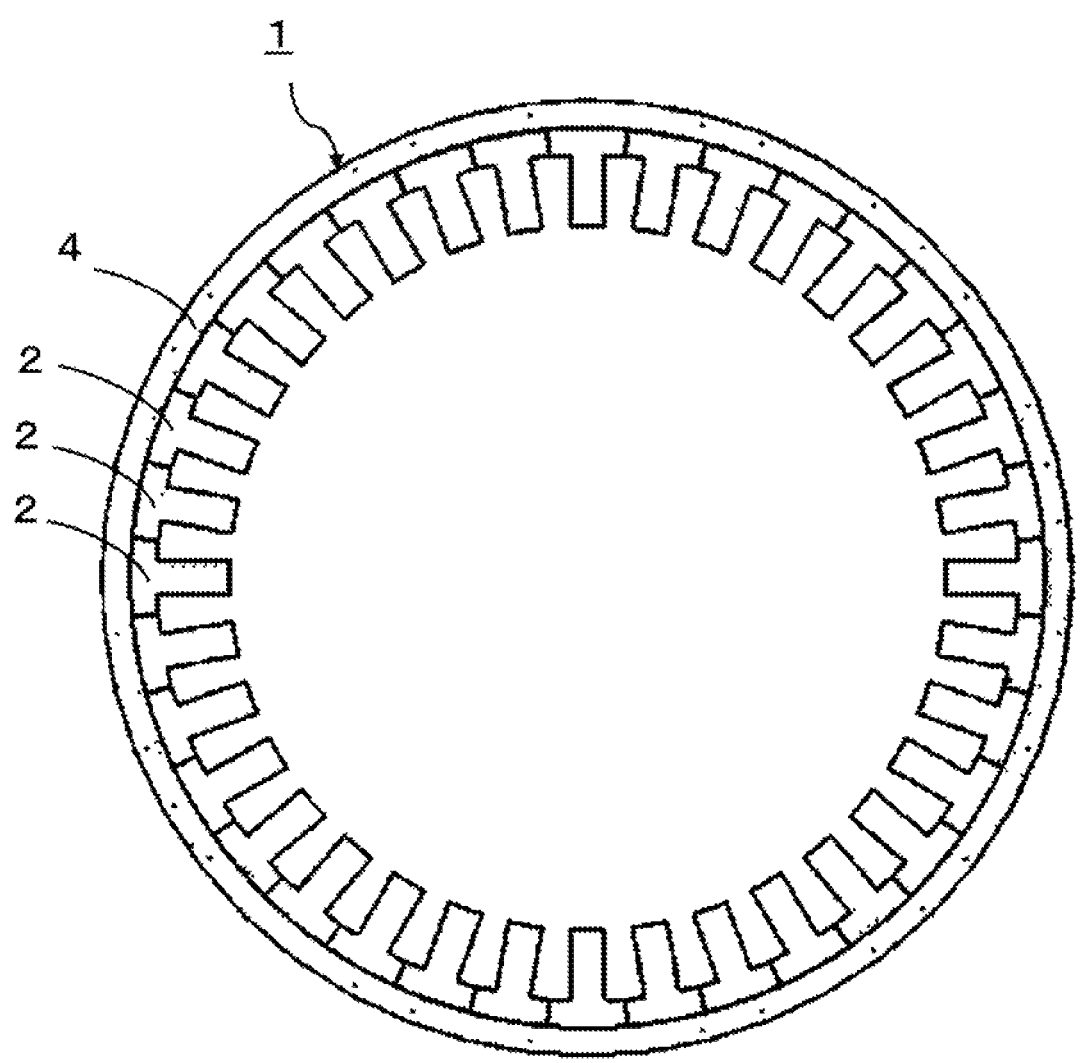
FIG. 2 is a plan view of a stator of the rotary electric machine according to the first embodiment as viewed in an axial direction.

FIG. 2 is a diagram illustrating the stator 1 of the rotary electric machine 100 according to the first embodiment as viewed in the axial direction of the rotor 5. The coils wound around the split cores 2 are not shown.

The stator 1 is formed by the split cores 2 combined to form an annular shape, and the split cores 2 are fitted to the frame 4 through press fitting or shrink fitting.

A pressure is applied from the frame 4 to each split core 2 so that the split core 2 is radially contracted, and adjacent ones of the split cores are, being in contact with each other, pressed against each other in the circumferential direction so as to counterbalance the pressure, whereby the annular shape of the split cores 2 is maintained.

In FIG. 2, each split core has one tooth, but the number of teeth of each split core is not limited to one.

Figure 3:
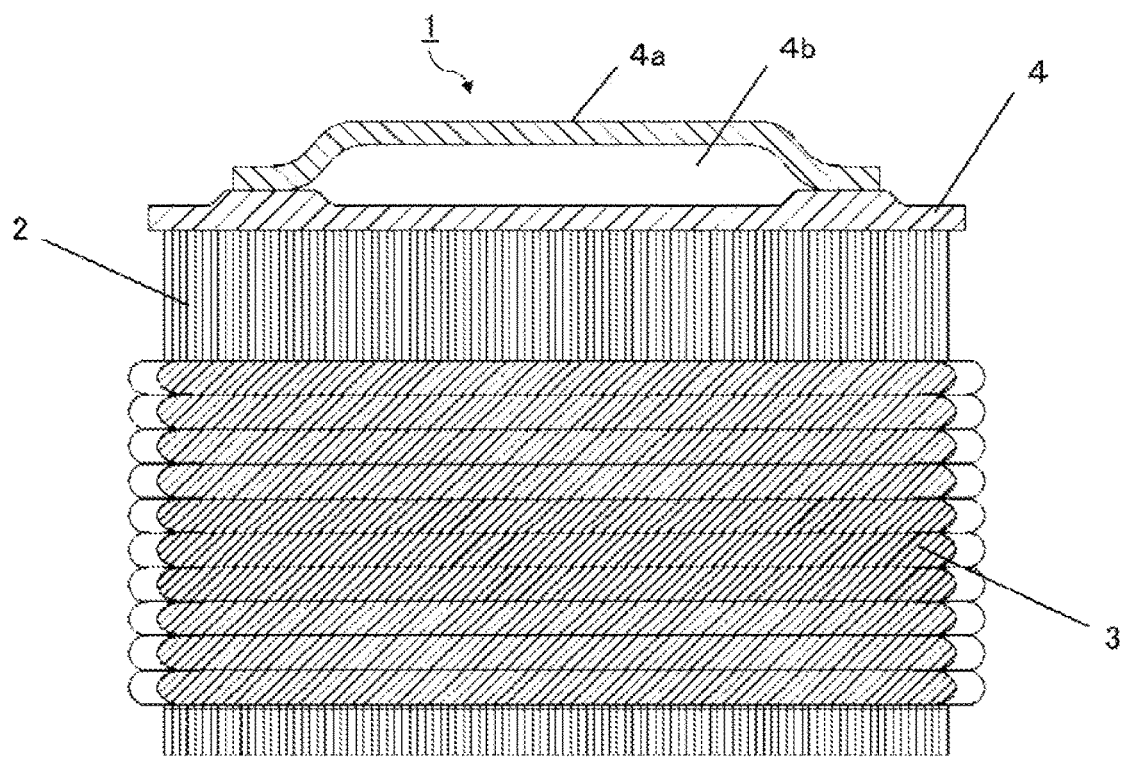
FIG. 3 is a sectional view illustrating a stator structure of the rotary electric machine according to the first embodiment.

FIG. 3 is a sectional view illustrating the stator 1 of the rotary electric machine according to the first embodiment.

In FIG. 3, the stator 1 includes the frame 4 and the split cores 2. The concentrated winding coil 3 is wound around each split core 2 to form a concentrated winding split core.

The adjacent concentrated winding split cores (not shown) are fitted to the frame 4, which is the annular member, through press fitting, shrink fitting, or the like.

The frame 4 has, on a radially outer side thereof, a jacket 4a that forms a coolant passage 4b for cooling each split core 2.

Figure 4:
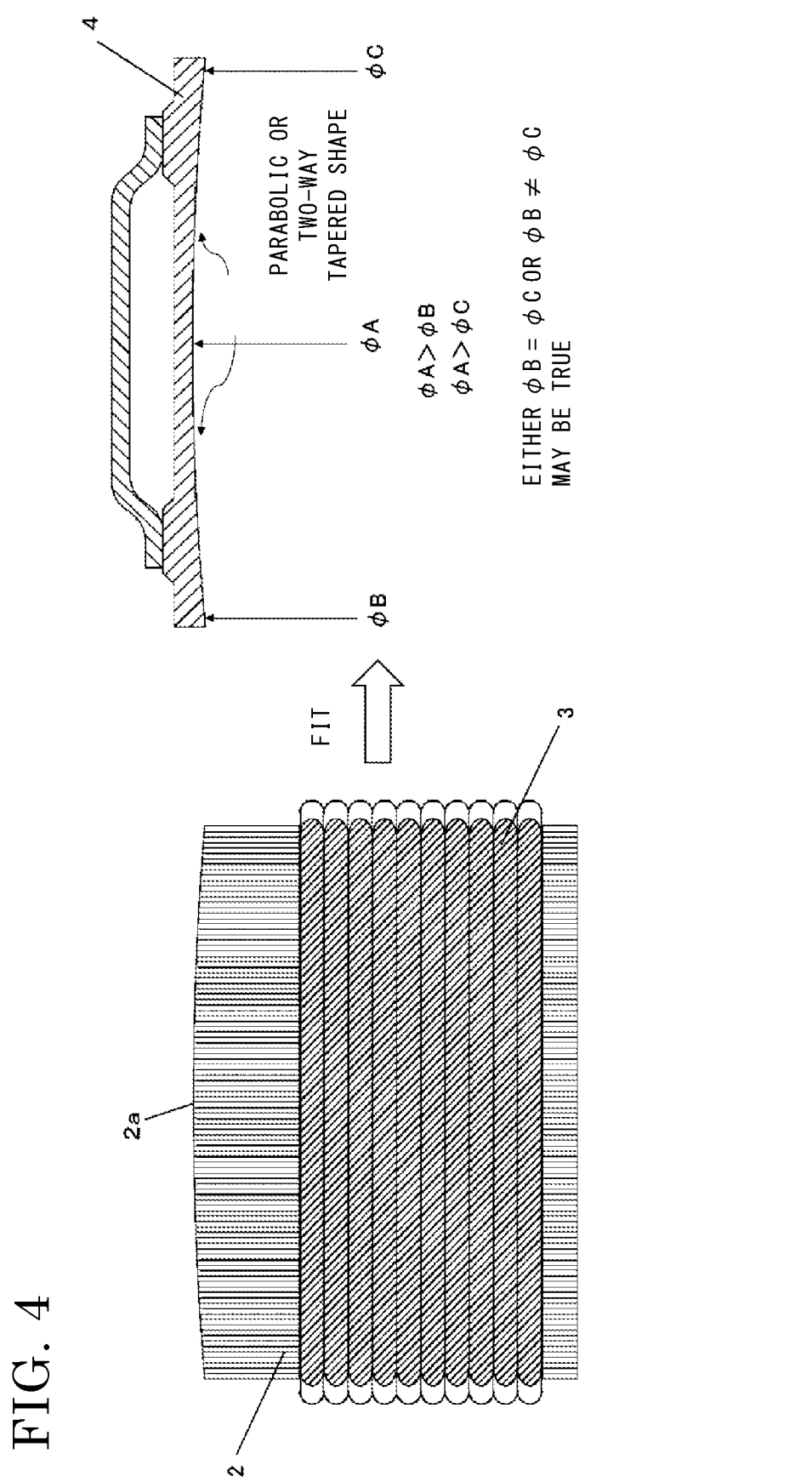
FIG. 4 is an explanatory diagram illustrating a process of fitting a split core to a frame being an annular member, according to the first embodiment.

FIG. 4 illustrates a process of fitting each split core 2 to the frame 4 according to the first embodiment. Here, an outer circumferential surface 2a of the split core 2 which is fitted to the frame 4 forms a barrel-like shape as illustrated in the figure, with an axial middle portion of the split core 2 bulging radially due to the winding of the concentrated winding coil 3. In this figure, the barrel-like shape is schematically depicted for clarity.

Figure 5:
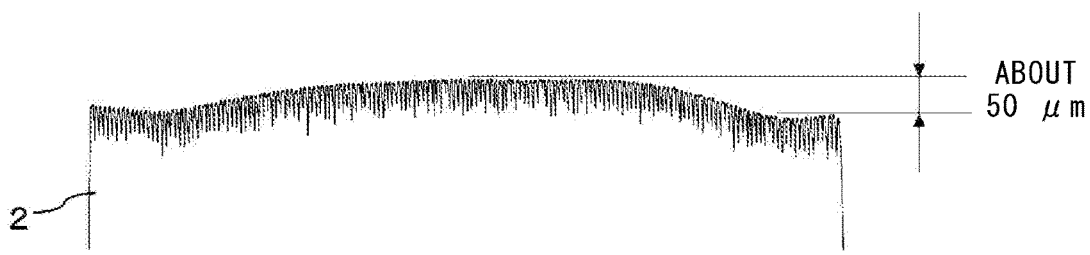
FIG. 5 is a diagram illustrating an example measurement of bulging of a core middle portion that results from winding of a coil around a split core according to the first embodiment.

FIG. 5 illustrates an example result of actually measuring the split core 2 bulging like a barrel with a shape measuring device. In this example, the axial middle portion of the split core 2 bulges radially by about 50 μm relative to both end portions thereof.

Meanwhile, the frame 4, which is the annular member fitted to the outer circumferential surface 2a of each split core 2, is formed such that the inner diameter of the frame 4 is smaller at both end portions than at an axial middle portion of the frame 4, and fitting fastening force between the frame 4 and the outer circumferential surface 2a of the split core 2 with the bulging axial middle portion is set to be greater at both end portions than at the axial middle portion.

It is assumed here that the terms "axial middle portion" and "both end portions" include not only a middle and both end surfaces, respectively, but also portions away therefrom by certain distances.

In the present embodiment, in order to embody the above configuration, the frame 4 may be formed in a parabolic shape as schematically illustrated in FIG. 4, with an inner diameter φA of the axial middle portion of the frame 4 being greater than each of inner diameters φB and φC of both end portions thereof, or may be formed in a tapered shape with the inner diameter of the frame 4 decreasing from the axial middle portion toward each of both the end portions. In this case, either φB=φC or φB≠φC may be true.

Next, an example analysis is presented to show that, when compared to a conventional technique, the configuration of the present embodiment produces an effect of achieving a greater fitting fastening force at each of both end portions than at the axial middle portion in a surface of contact between the frame 4 and each split core 2.

Figure 6:
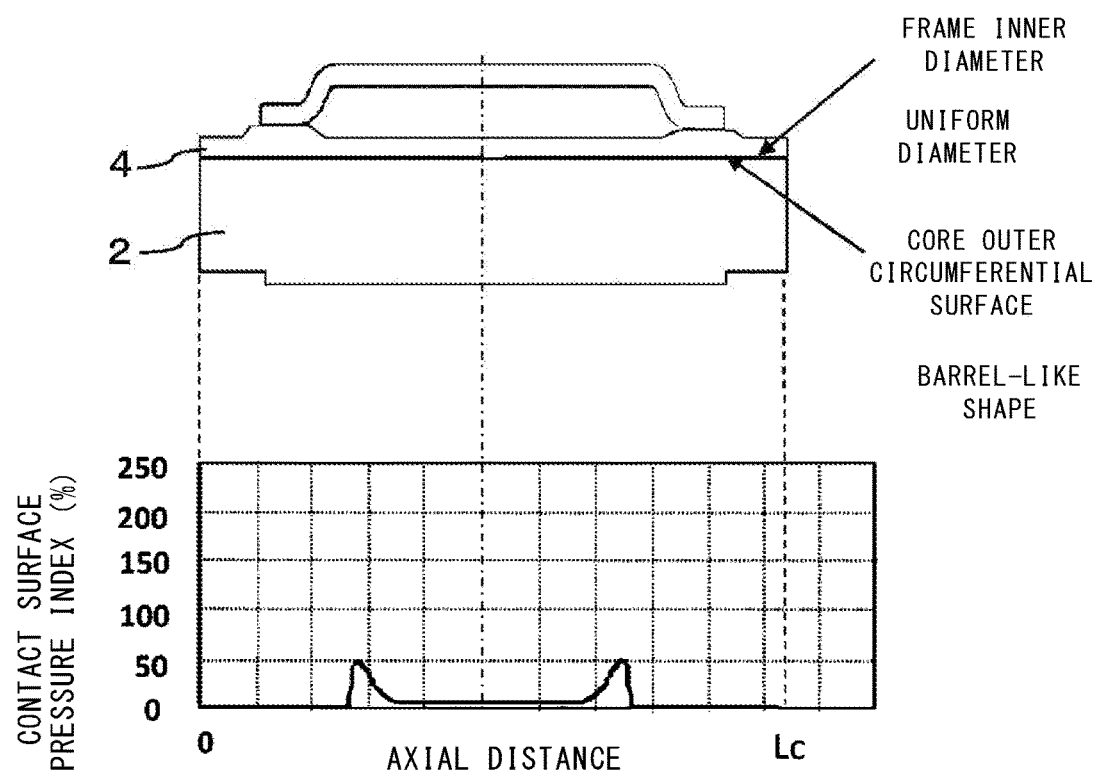
FIG. 6 is a diagram illustrating an example analysis about a contact surface pressure distribution in the case where a core deformed into a barrel-like shape has been fitted to a conventional frame as contrasted with the first embodiment.

FIG. 6 illustrates an example analysis of contact surface pressure in the case where a conventional frame 4 has been fitted to the split cores 2 with the bulging axial middle portion. This frame 4 has a uniform inner diameter, providing a predetermined interference for the outside diameter of the split cores.

The lower diagram of FIG. 6 illustrates a result of an analysis of contact surface pressure at core axial positions (the diagram represents an index for a desired surface pressure; the axial positions are defined with Lc representing the stacking thickness of the core).

This shows that contact surface pressures are generated at positions relatively close to the axial middle portion, since the bulging of the axial middle portion of the split core 2 prevents a contact between the frame 4 and the split core 2 at each of both the end portions.

At the axial middle portion of the frame 4, a sufficient contact or interference between the frame 4 and the split core 2 is ensured due to the bulging of the core, but, because the frame 4 has a relatively small thickness and low rigidity, little surface pressure is generated due to a large deformation of the frame 4.

Figure 7:
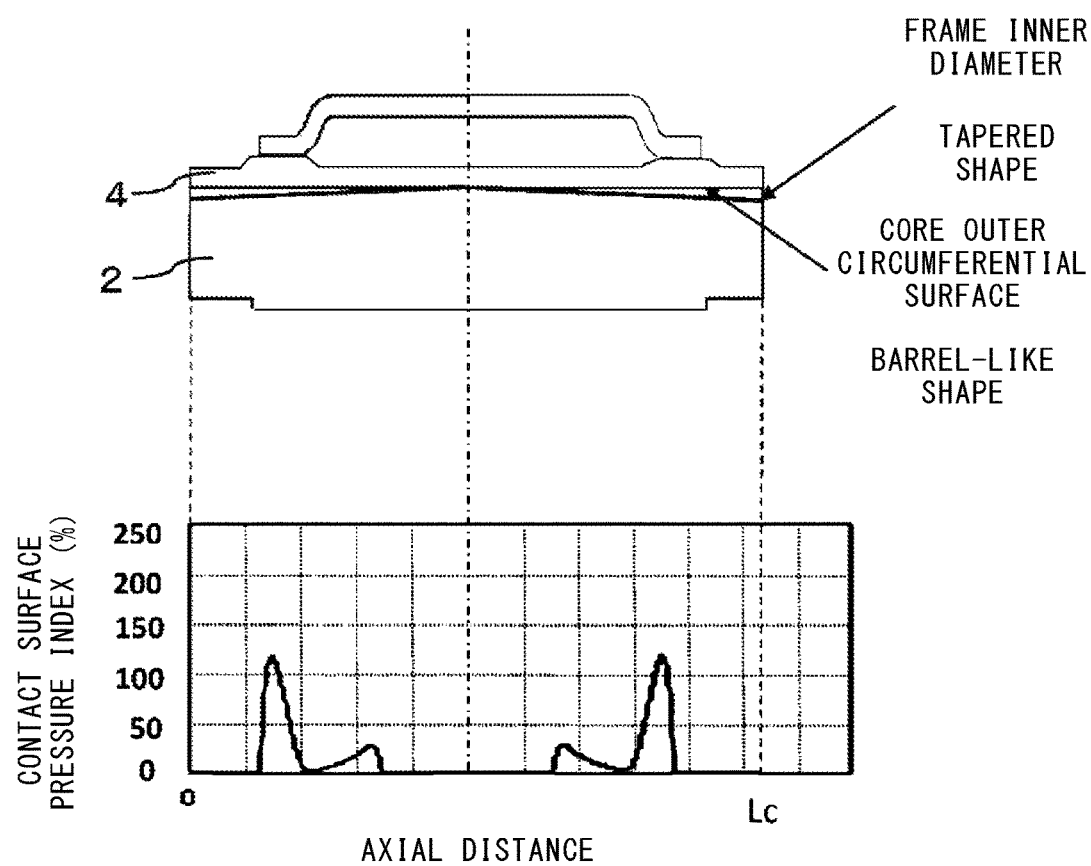
FIG. 7 is a diagram illustrating an example analysis about a contact surface pressure distribution in the case where a core deformed into a barrel-like shape has been fitted to the frame according to the first embodiment.

Meanwhile, FIG. 7 illustrates an example analysis about a contact surface pressure distribution in the case where the split cores 2 deformed into a barrel-like shape have been fitted to the frame 4 according to this first embodiment.

In this example analysis, an interference between the frame 4 and each split core 2 at the axial middle portion is the same as the interference illustrated in FIG. 6, and an interference is provided between the frame 4 and each of both the end portions of the split core 2 through the tapering toward both the end portions which causes the inner diameter of each of both the end portions of the frame 4 to decrease in a tapering manner as in the present embodiment.

The lower diagram of FIG. 7 illustrates a result of this analysis. This analysis result shows that, even when the split cores 2 bulging into a barrel-like shape have been fitted to the frame 4, in contrast to a conventional frame, sufficient contact surface pressure can be obtained at each of both the end portions due to smaller inner diameters of the frame 4 at both the end portions than at the axial middle portion. In addition, the fitting fastening force (=contact surface pressure*contact area) between the frame 4 and each split core 2 can be increased due to an enlarged contact region.

As described above, according to this first embodiment, in the rotary electric machine including the stator 1 that includes: the frame 4 which is the annular member; and the split cores 2 arranged in an annular shape and fitted to and held by the radially inner portion of the frame 4, the frame 4 is formed such that the inner diameter of each of both end portions thereof is smaller than the inner diameter of the axial middle portion thereof, and the fitting fastening force between the frame 4 and each split core 2 is set to be greater at both the end portions than at the axial middle portion. Therefore, a rotary electric machine that generates little noise and little vibration owing to an out-of-plane deformation can be obtained even with use of concentrated winding split cores with an axial middle portion that bulges as a result of coil winding.

Second Embodiment

Figure 8:
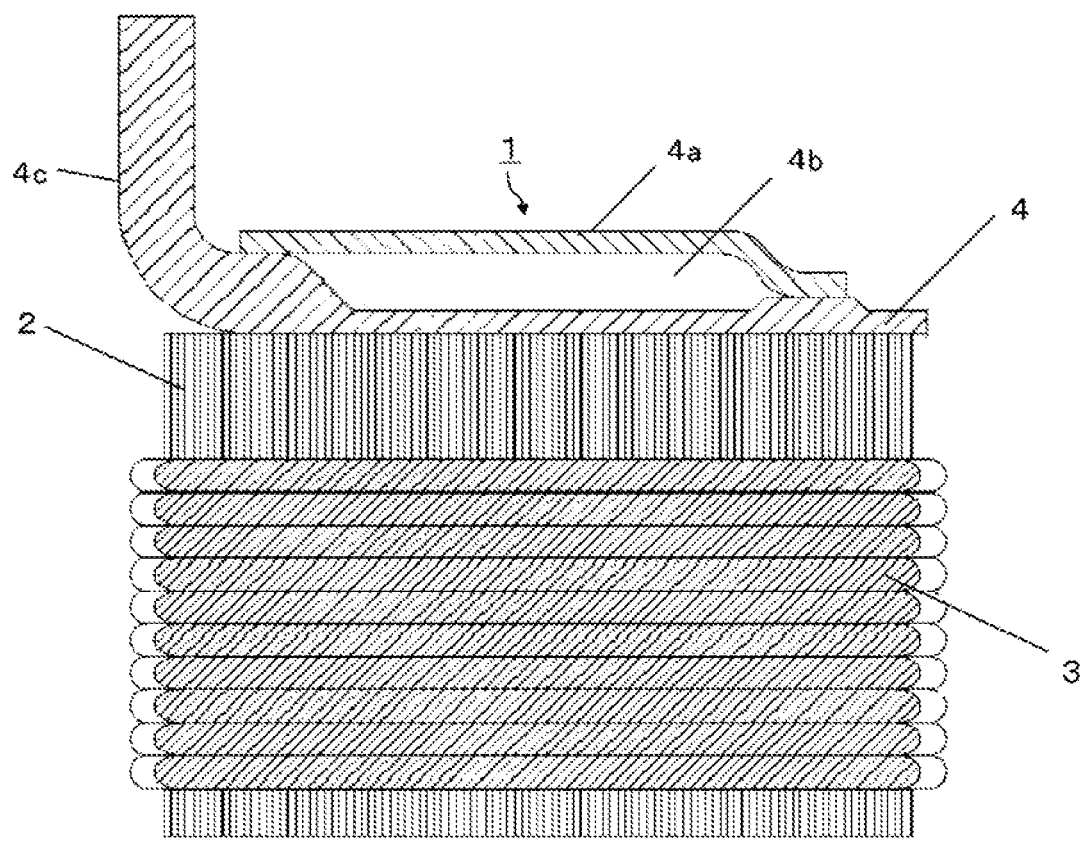
FIG. 8 is a sectional view illustrating a stator structure of a rotary electric machine according to a second embodiment of the present disclosure.

FIG. 8 is a sectional view illustrating major portions of a stator of a rotary electric machine according to a second embodiment of the present disclosure.

Figure 9:
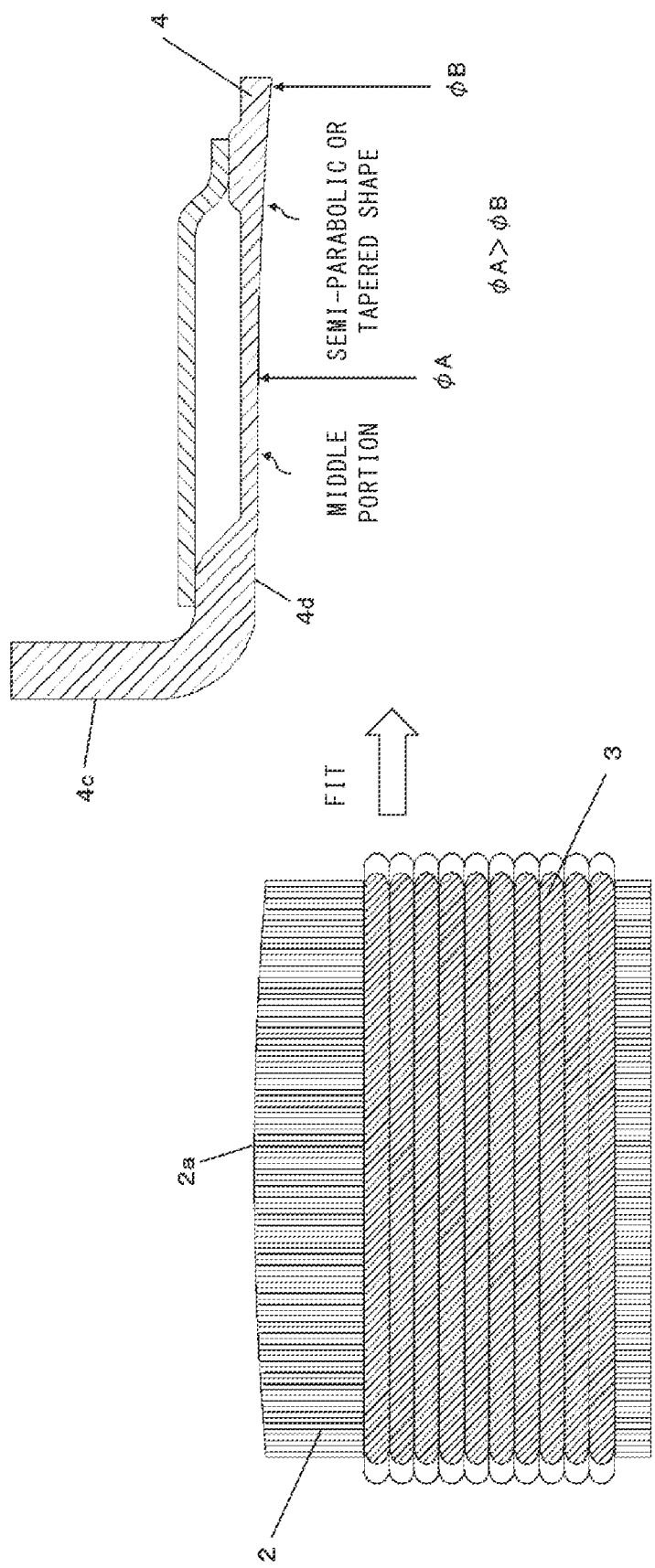
FIG. 9 is an explanatory diagram illustrating a process of fitting a split core to a frame being an annular member according to the second embodiment.

This embodiment is different from the first embodiment particularly in that a flange 4c extending in a radial direction is disposed at one end of a frame 4 which is an annular member. FIG. 9 illustrates a process of fitting a split core 2 to the frame 4 according to the second embodiment.

Since the frame 4 has the flange 4c at one end thereof as illustrated in FIG. 8, the frame 4 has significantly different rigidities at both ends thereof, and the rigidity at the end portion having the flange 4c is greater than the rigidity at the other end.

Accordingly, an opposite-to-flange-side end portion of the frame 4 is formed in a semi-parabolic or tapered shape as illustrated in FIG. 9, with an inner diameter φB of the opposite-to-flange-side end portion being smaller than an inner diameter φA of an axial middle portion of the frame 4, as in the example presented in connection with the first embodiment.

Meanwhile, the end portion having the flange 4c is arranged to have an inner diameter equal to the inner diameter φA of the axial middle portion of the frame 4.

In the present embodiment, in particular, the frame 4 has excessive rigidity in the vicinity of an inner circumferential portion of the flange 4c as described above, and accordingly, a relief portion 4d having an inner diameter greater than the inner diameter of the axial middle portion is formed in a portion of the frame 4 which lies in the vicinity of the inner circumferential portion of the flange 4c.

Figure 10:
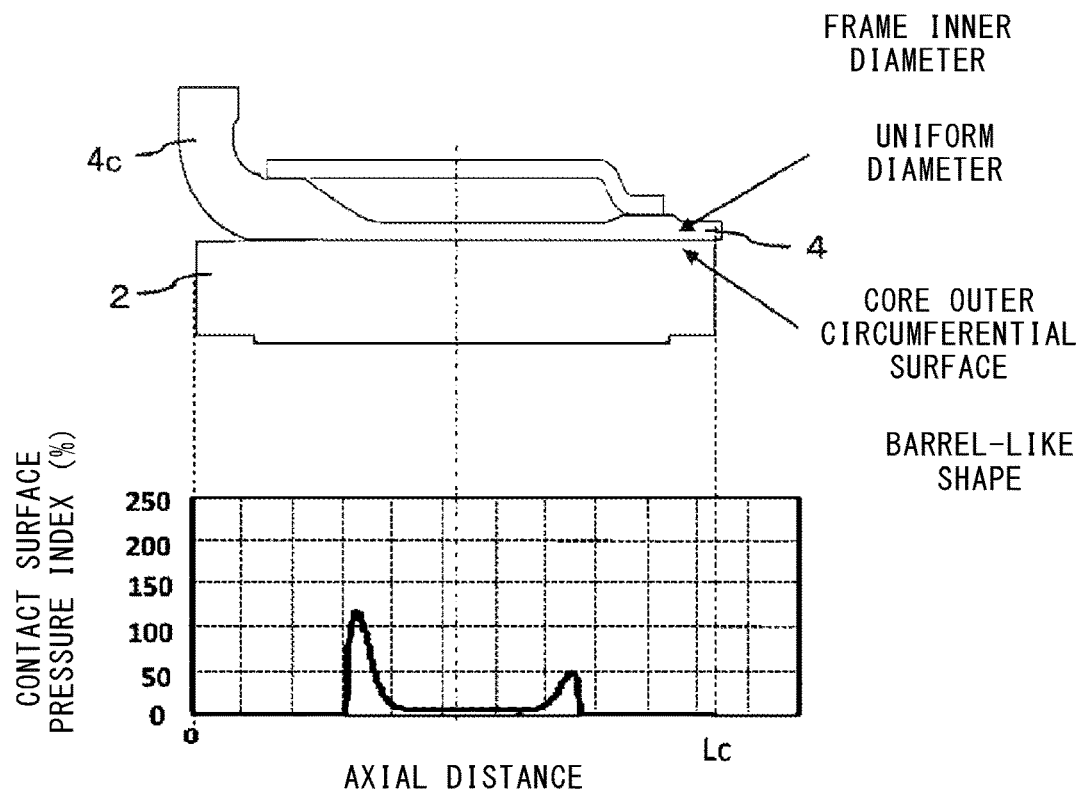
FIG. 10 is a diagram illustrating an example analysis about a contact pressure distribution in the case where a core deformed into a barrel-like shape has been fitted to a conventional frame as contrasted with the second embodiment.

FIG. 10 illustrates an example analysis of a conventional technique, showing that a thickness varying portion extending from the vicinity of the inner circumferential portion of the flange 4c to the axial middle portion of the frame 4 allows a sufficient surface pressure to be generated even with the conventional technique, while a high surface pressure is not easily generated at the opposite-to-flange-side end portion because a bulging of a core prevents a sufficient contact or interference at the end portion as in the example illustrated in FIG. 6.

Figure 11:
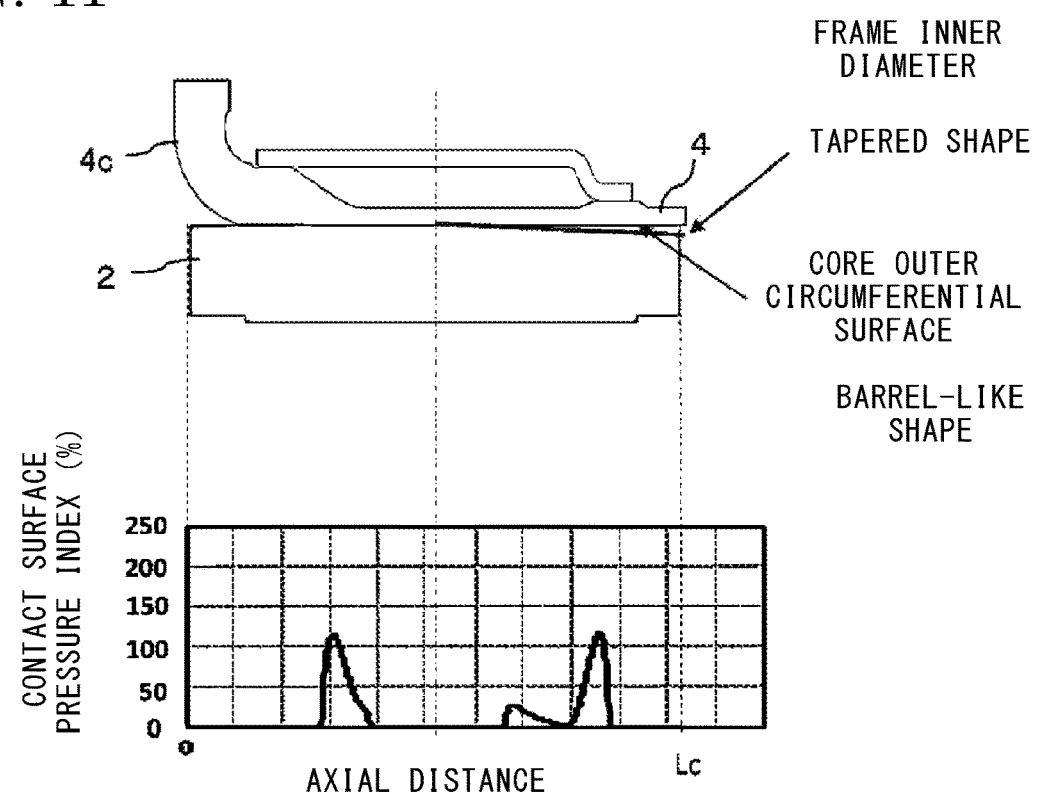
FIG. 11 is a diagram illustrating an example analysis about a contact surface pressure distribution in the case where a core deformed into a barrel-like shape has been fitted to the frame according to the second embodiment.

FIG. 11 illustrates an example analysis in the case where the inner diameter of the frame 4 on the side opposite to the flange is arranged to decrease in a tapering manner in the second embodiment, and this example analysis shows that an improvement in contact surface pressure is achieved particularly on the side opposite to the flange, and that an area where surface pressures are generated is enlarged to achieve an improvement in fitting fastening force.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 100 rotary electric machine
1 stator
2 split core
2a outer circumferential surface
3 concentrated winding coil
4 frame
4a jacket
4b coolant passage
4c flange
4d relief portion
5 rotor
6 rotating shaft
7 bearing

The invention claimed is:

1. A rotary electric machine comprising a stator, the stator including a frame being an annular member, and a plurality of split cores arranged in an annular shape and fitted to and held by a radially inner portion of the frame, wherein
the frame is made of a member being one body in the axial direction and is formed such that an inner diameter of each of both end portions thereof is smaller than an inner diameter of an axial middle portion thereof, and fitting fastening force between the frame and each split core is set to be greater at both the end portions than at the axial middle portion.

2. The rotary electric machine according to claim 1, wherein the frame is formed in a parabolic shape with an inner diameter thereof decreasing from the axial middle portion toward each of both the end portions.

3. The rotary electric machine according to claim 2, wherein each split core is a concentrated winding split core with a concentrated winding coil wound therearound.

4. The rotary electric machine according to claim 1, wherein the frame is formed in a tapered shape with an inner diameter thereof decreasing from the axial middle portion toward each of both the end portions.

5. The rotary electric machine according to claim 4, wherein each split core is a concentrated winding split core with a concentrated winding coil wound therearound.

6. The rotary electric machine according to claim 1, wherein each split core is a concentrated winding split core having a barrel-shaped shape wherein the axial middle portion bulges in the radial direction.

7. The rotary electric machine according to claim 1, wherein the frame has a coolant passage which is provided on a radially outer side thereof so as to straddle the axial middle portion.

8. A rotary electric machine comprising a stator, the stator including a frame being an annular member having a flange disposed at one end thereof, and a plurality of split cores arranged in an annular shape and fitted to and held by a radially inner portion of the frame, wherein
the frame is made of a member being one body in the axial direction and is formed such that an inner diameter thereof is smaller at an opposite-to-flange-side end portion thereof than at an axial middle portion thereof, and fitting fastening force between the frame and each split core is set to be greater at a flange-side end portion and the opposite-to-flange-side end portion than at the axial middle portion,
wherein the axial middle portion of the frame bulges in the radial direction.

9. The rotary electric machine according to claim 8, wherein the frame is formed in a semi-parabolic shape with the inner diameter thereof decreasing from the axial middle portion toward the opposite-to-flange-side end portion.

10. The rotary electric machine according to claim 9, wherein the frame has, formed in a portion thereof lying in a vicinity of an inner circumferential portion of the flange, a relief portion having an inner diameter greater than the inner diameter of the axial middle portion.

11. The rotary electric machine according to claim 9, wherein each split core is a concentrated winding split core with a concentrated winding coil wound therearound.

12. The rotary electric machine according to claim 8, wherein the frame is formed in a tapered shape with the inner diameter thereof decreasing from the axial middle portion toward the opposite-to-flange-side end portion.

13. The rotary electric machine according to claim 12, wherein the frame has, formed in a portion thereof lying in a vicinity of an inner circumferential portion of the flange, a relief portion having an inner diameter greater than the inner diameter of the axial middle portion.

14. The rotary electric machine according to claim 12, wherein each split core is a concentrated winding split core with a concentrated winding coil wound therearound.

15. The rotary electric machine according to claim 8, wherein the frame has, formed in a portion thereof lying in a vicinity of an inner circumferential portion of the flange, a relief portion having an inner diameter greater than the inner diameter of the axial middle portion.

16. The rotary electric machine according to claim 15, wherein each split core is a concentrated winding split core with a concentrated winding coil wound therearound.

17. The rotary electric machine according to claim 8, wherein each split core is a concentrated winding split core with a concentrated winding coil wound therearound having a barrel-shaped shape.

18. A rotary electric machine comprising a stator, the stator including a frame, being an annular single member, a plurality of split cores, each of which is formed by a plurality of steel sheets stacked in an axial direction of the frame and is fitted and held by a radially inner portion of the frame while being in contact therewith without gaps and arranged in an annular shape, and a concentrated winding coil wound on each of the plurality of split cores, wherein
the frame is formed such that an inner diameter of each of both end portions thereof decreases continuously from the axial middle portion of the stator toward the end portions, and fitting fastening force between the frame and each split core is set to be greater at both the end portions than at the axial middle portion.

19. The rotary electric machine according to claim 18, wherein the frame is formed in a parabolic shape with an inner diameter thereof decreasing from the axial middle portion toward each of both the end portions.

20. The rotary electric machine according to claim 18, wherein the frame is formed in a tapered shape with an inner diameter thereof decreasing from the axial middle portion toward each of both the end portions.

21. A rotary electric machine comprising a stator, the stator including a frame, being an annular single member arranged a flange at one end thereof, a plurality of split cores, each of which is formed by a plurality of steel sheets stacked in an axial direction of the frame and is fitted and held by a radially inner portion of the frame while being in contact therewith without gaps and arranged in an annular shape, and a concentrated winding coil wound on each of the plurality of split cores, wherein
the frame is formed such that an inner diameter of each of both end portions thereof decreases continuously from the axial middle portion of the stator toward both axial end portions, and fitting fastening force between the frame and each split core is set to be greater at the flange-side end portion, and the opposite-to-flange-side end portion than at the axial middle portion.

22. The rotary electric machine according to claim 21, wherein the frame is formed in a semi-parabolic shape with the inner diameter thereof decreasing from the axial middle portion toward the opposite-to-flange-side end portion.

23. The rotary electric machine according to claim 21, wherein the frame is formed in a tapered shape with the inner diameter thereof decreasing from the axial middle portion toward the both axial end portions.

* * * * *